(No Model.)

U. H. ODELL.
ROLLER REDUCING AND SEPARATING MILL.

No. 264,559. Patented Sept. 19, 1882.

Attest
Jno. E. Jones
Herbert P. Cook

Inventor
Udolpho H. Odell,
by Wood & Boyd
his Attorneys.

(No Model.)

U. H. ODELL.
ROLLER REDUCING AND SEPARATING MILL.

No. 264,559. Patented Sept. 19, 1882.

Attest
Jno. L. Jones
Herbert P. Cook

Inventor
Udolpho H. Odell,
by Wood & Boyd
his Attorneys.

(No Model.) 5 Sheets—Sheet 3.

U. H. ODELL.
ROLLER REDUCING AND SEPARATING MILL.

No. 264,559. Patented Sept. 19, 1882.

(No Model.) 5 Sheets—Sheet 4.
U. H. ODELL.
ROLLER REDUCING AND SEPARATING MILL.
No. 264,559. Patented Sept. 19, 1882.

(No Model.)  5 Sheets—Sheet 5.

U. H. ODELL.
ROLLER REDUCING AND SEPARATING MILL.

No. 264,559.  Patented Sept. 19, 1882.

Witnesses.
Robert Everett,
George W. Rea

Inventor:
Udolpho H. Odell,
By Wood & Boyd
Att'ys.

UNITED STATES PATENT OFFICE.

UDOLPHO H. ODELL, OF DAYTON, OHIO.

ROLLER REDUCING AND SEPARATING MILL.

SPECIFICATION forming part of Letters Patent No. 264,559, dated September 19, 1882.

Application filed March 7, 1882. (No model.)

*To all whom it may concern:*

Be it known that I, UDOLPHO H. ODELL, a citizen of the United States, and a resident of Dayton, in the county of Montgomery and State of Ohio, have invented certain new and useful Improvements in Roller Reducing and Separating Mills, of which the following is a specification.

This invention relates to improvements in roller reducing and separating mills, and has for its objects to provide novel and efficient devices for adjusting the laterally-movable reducing-rolls and the hopper-gate mechanism; to provide a combination of devices whereby the grain is reduced, then separated, and afterward further reduced; to provide dust-tight compartments for the separating devices to prevent the escape of flour-dust into the room, and to provide efficient means for starting and stopping the series of mills simultaneously. These objects I accomplish by the mechanism and by the arrangement of parts illustrated in the accompanying drawings, in which—

Figure 1:
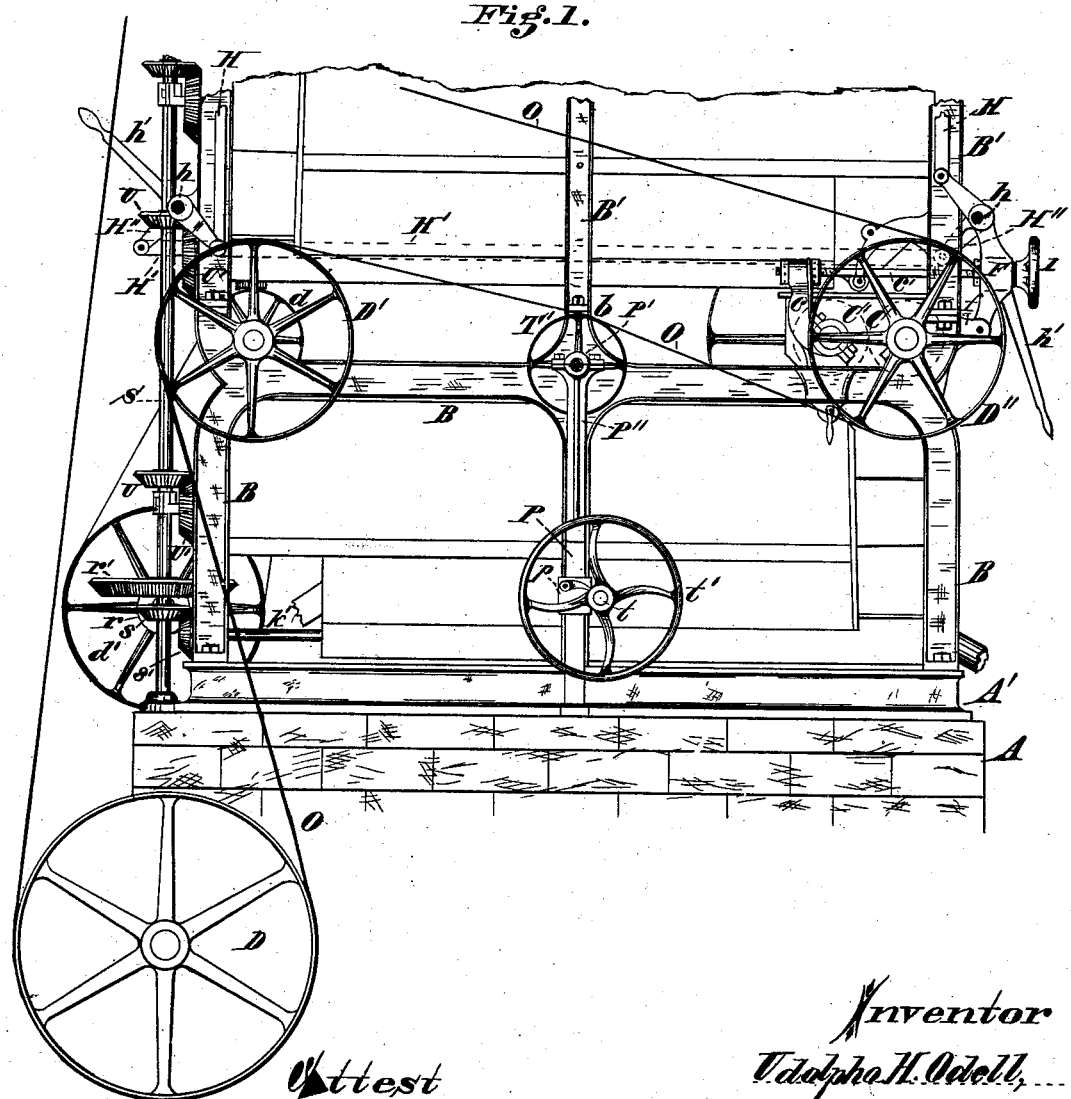
Figure 2:
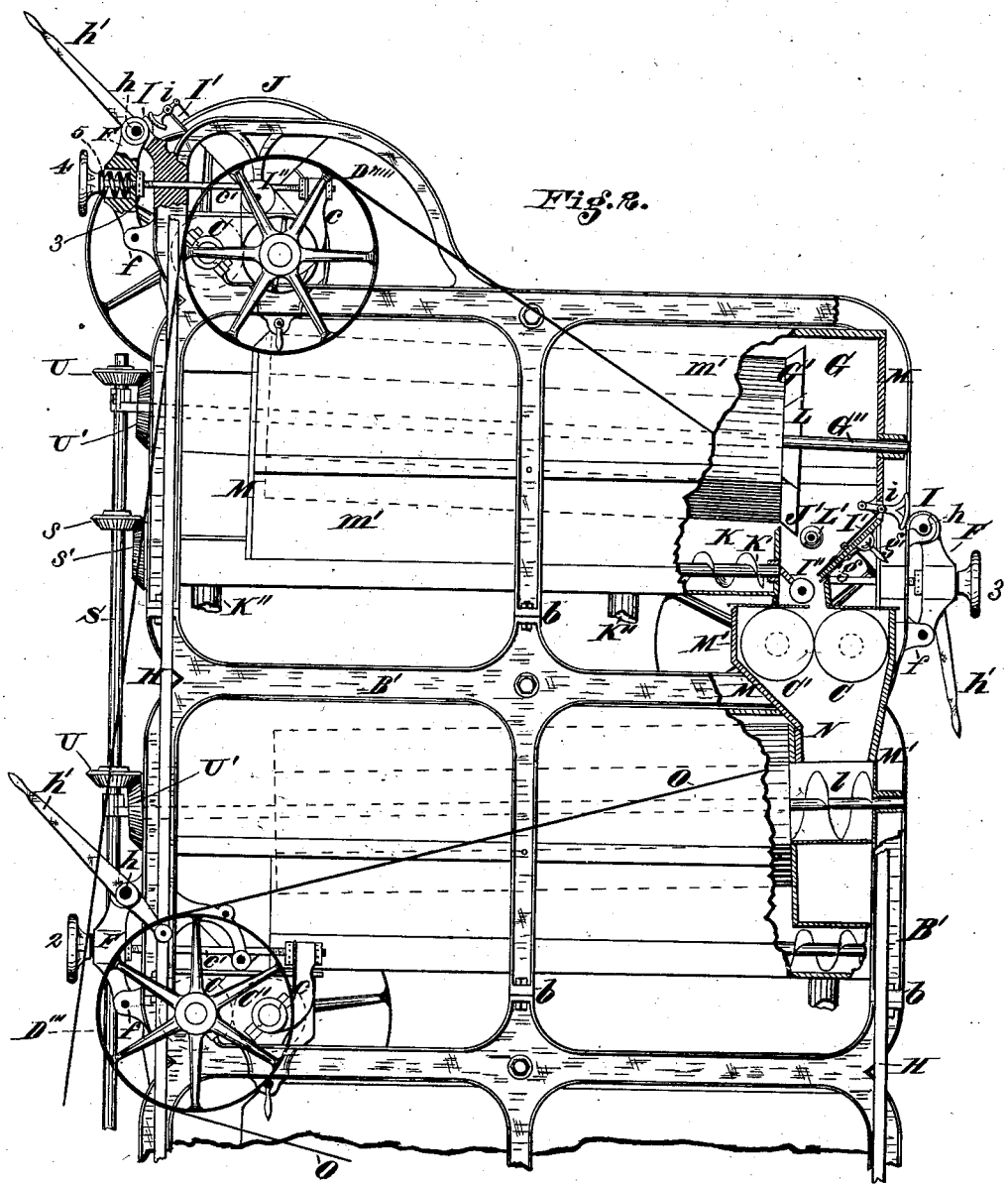
Figure 3:
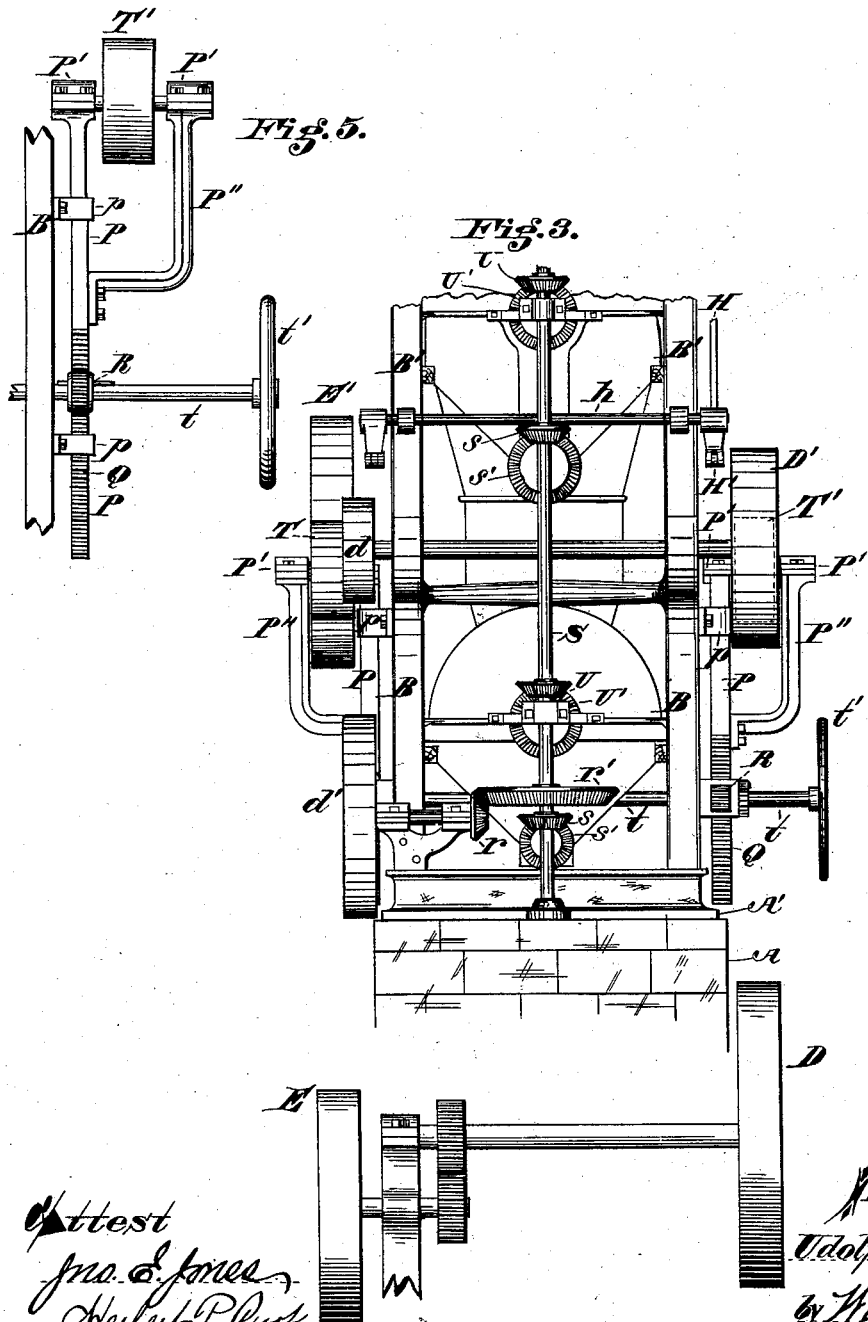
Figure 4:
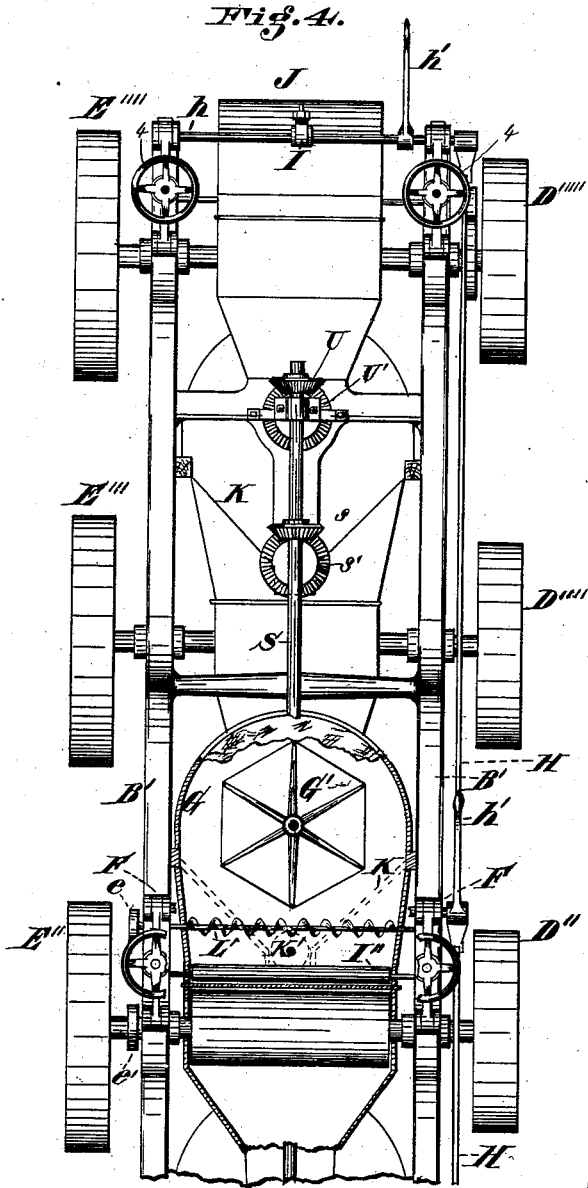

Figure 1 represents a side elevation of the lower portion of a machine embodying my invention; Fig. 2, a similar view, partly in section, showing the upper portion of the machine; Fig. 3, an end elevation of the portion of the machine shown in Fig. 1; Fig. 4, a similar elevation of the portion of the machine shown in Fig. 2; Fig. 5, an elevation of the belt-tightener mechanism, showing it arranged on a broken section of the main frame of the machine; and Fig. 6, an enlarged vertical sectional view, broken away, of a portion of the upper part of the machine, to more clearly illustrate the parts shown in section in Fig. 2.

A represents the floor or foundation, upon which the machine rests.

A' is a bed-plate, to which the machine-frame is rigidly attached.

B represents the frame-work of the lower portion of the machine, and B' the frame-work of each of the secondary machines, which are made in separate sections and attached in series by bolts or their equivalents, to unite the joints $b$. This provides for an easy combination of any number of machines, resting one above the other, to form a reducing and separating mill in a continuous series.

C C' represent the sets of reducing-rolls, one of which is preferably driven at a faster speed than the other.

$c$ represents the swinging journal-arms, upon which the adjustable rollers are journaled.

$c'$ represents horizontal adjusting-shafts attached to swinging journal-arms $c$.

Nuts 1, 2, 3, and 4 are for adjusting the arms F and the tension of springs 5, which springs allow the rolls journaled to arms $c$ to yield to undue strain between the faces of the rolls.

It will be observed that the tension of the springs can be adjusted by means of the screw-nuts independently of the set of the rolls journaled upon the arms $c$.

$f$ represents the ears upon each side of the frame, to which are pivoted the swinging arms F, which support the ends of the shafts $c'$, and within each of which is formed a housing to hold the coiled spring 5.

The parts $c$, $c'$, $f$, F, and 1, 2, 3, 4, and 5 are duplicated upon each side of the machine, so as to regulate and control the journals upon each end of the adjustable rolls and allow of their parallel adjustment.

$h$ represents through-shafts journaled upon the frame B or B', as shown in Figs. 1, 2, and 3. The shafts are eccentrically journaled at each end to the pivoted arms F. Other equivalent means for moving the journal-arms F may be substituted for the eccentrics.

$h'$ represents a lever or crank arm rigidly attached to the shaft $h$.

I represents a segmental rack; $i$, a similar rack pivoted to the frame of the machine, and to this rack is pivoted one end of a link, I', the other end of which is pivoted to the adjustable hopper-gate.

As the lever $h'$ is moved down the eccentrically-journaled arms F are carried inwardly at their upper ends and the journal-arms are moved inwardly, together with the shaft $c'$ and journal-arms $c$, thus separating the movable from the stationary roll. By this movement segment I operates segment $i$, the link I' closing the hopper-gate down upon the feed-roll I''. A reverse movement of lever $h'$ opens the hopper-gate and brings the rolls together for operation.

It is desirable in a mill comprising a series of sets of rolls to stop, start, and adjust the rolls and the hopper-gate mechanism of the seties of rolls by a single lever movement and at different points of the machine. This I obtain as follows: H H represent vertical rods, which are pivoted to the projecting arms of levers $h'$, so that as either one of the series of levers on one side of the machine moves motion will be communicated to the adjusting mechanism of the other mills of the series in the same vertical line. In order to convey motion from one of the levers on one side of the machine to the series of adjusting mechanisms which are arranged vertically one above the other on the opposite side of the machine, I provide one or more transverse connecting-rods, $H'$, which are pivoted to stud-arms $H''$, rigidly connected to the through-shafts $h$. By this means a simultaneous adjustment of all the mechanisms arranged alternately on each side of the machine is effected by the movement of a single one of the series of levers $h'$. I also provide an independent series of hopper-gates, $g$, which are adjusted singly by the pivoted levers $g'$.

J represents the upper hopper of the series of mills, from which the grain is fed into the first of the series of rolls, and is preferably provided with the ordinary feed-roll, $I''$.

G represents a separating-chamber, within which revolves a many-sided reel, $G'$, which is suitably journaled on an actuating-shaft, $G''$.

$l$ represents a screw upon the reel, for feeding the reel. The bottom of this chamber is provided with a hopper-shaped bottom, K, near the bottom of which is journaled a longitudinal screw-conveyer, $K'$.

$K''$ $K''$ represent one or more spouts projecting through the hopper-bottom of the reel-chamber, for discharging the fine material separated by the bolt. The spouts $K''$ are preferably connected by tight spouting to a receiver or elevator located away from the machine.

$J'$ represents the secondary hoppers, located within the reel-chambers, vertically under the open ends of the reels, which are made flaring, as at L, to effect an easy discharge of the tailings.

$L'$ represents a transverse right-and-left-hand distributer, which is journaled on a shaft and revolves to evenly distribute the tailings which fall thereon along the feed-roll $I''$.

M represents the frame of the reel-chamber G.

$m'$ represents the shell or casing attached to the frame B to form a dust-tight compartment, within which the reel and separating devices work.

Figure 6:
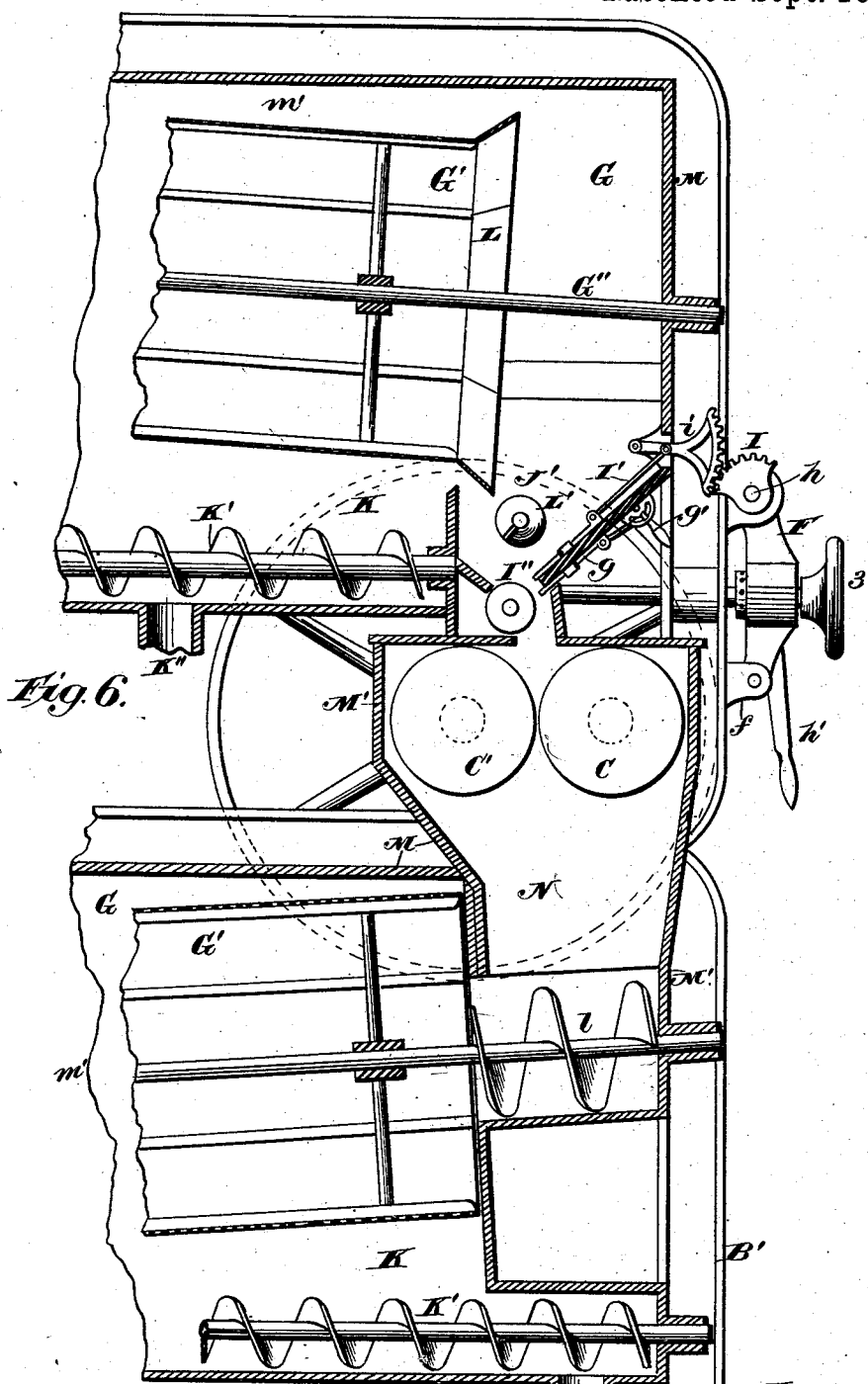

$M'$ represents a similar dust-tight compartment, within which the rolls work. It is hopper-shaped at the bottom, forming the spout N for delivering the reduced material into the hopper $l$ of the next succeeding reel, as shown in Figs. 2 and 6.

Each of the series of mills is constructed and arranged within dust-tight compartments, with spout-connections leading into the next succeeding mill, constructed in a similar manner, the whole forming a series of automatically-feeding and gradual-reduction mills. To accomplish this the rolls of each mill are placed at the opposite end of the machine from those of the series next above or next below, so that the reel separating the product of one series of rolls feeds its unbolted material directly into the feed-rolls next in the series, the material traveling alternately across the machine through the reels from one set of rolls to the next, being bolted in its passage through the reels and successively reduced and bolted by its passage through each of the mills of the series.

Different sizes of mesh of bolting-cloth may be employed in each or any one of the reels, and a separation of the flour effected in the usual manner, if desired.

A modification of my arrangement in a series of mills might be effected as follows: All of the roller and hopper mechanisms might be mounted on the same end of the machine by providing a second conveyer, leading from the tail of the reel to the secondary hopper; but this would require an additional space between the bottom of the reel-chamber of one mill and the hopper of the rolls in the next mill to which the stuff is conveyed, and would not be as cheap and as simple as the plan herein shown.

A further modification of my improvement would be to use two or three series of mills and arrange two or more of them side by side, conveying the tailings from one mill or from the bottom series of mills by an elevator into a hopper of an adjacent mill. In such a case the elevator-spout and hopper should be joined, so as to make a tight passage of the chamber, to prevent the escape of dust into the air while the material is being transmitted from one mill to the other. The frames of each mill are made in sections, so as to readily allow this separation or combination.

The driving mechanism of my machine is preferably constructed and arranged as follows: D represents a driving-pulley on the power-shaft, from which the belt O passes over pulley $D'$, on the opposite end of the shaft of which is a transmitting-pulley, $d$, for driving the reel mechanism. Belt O thence passes over the tightener-pulley $T'$, thence over pulley $D''$, which is fixed to the shaft of one of the rolls C; thence transversely across the machine over pulley $D'''$, for driving one of the rolls of the mill next in the series; thence transversely across the machine over the roller-pulley of the mill next in the series; thence transversely across the machine over pulley $D'''''$, for driving one of the rolls of the upper series of rolls, and thence around pulley D, driving the entire series of fast-speeded rolls by one belt. It is obvious that any number of series of rolls or mills may be employed in the series and driven by a belt in this manner. The other or slower-speeded rolls are driven in a like manner by a similar arrangement of belts and pulleys, arranged on the opposite side of the machine.

E', Fig. 3, represents the first transmitter, driven by the power-pulley E, which is rotated by driving-pulley D and gear-wheels, as shown in Fig. 3, and E'', E''', and E'''' represent the pulleys on the shafts of the slower-speeded rolls.

An inferior mode of driving my series of mills would be by gears instead of belting, and so, also, belts might be used for driving the rolls upon pulleys arranged upon one side of the machine only; but this would not be as effective as the devices herein shown.

It is also desirable to stop and start the operation of the machine by means of tightener-pulleys, which are also arranged to have sufficient movement to serve as belt-tighteners simply. I have accomplished this by the following arrangement of parts: P represents a vertically-adjustable pulley-frame connected with the frame B. p represents guides attached to frame B, in which the standards P move up and down. T T' represent the tightener-pulleys, and P' P' the journals for said pulley-shafts, which are shown as attached to each side of the frame B, mounted on the upper ends of brackets P''. t represents a through-shaft journaled to frame B, upon which is mounted a hand-wheel, t'. Q represents rack-teeth upon the faces of standards P. R represents pinions mounted on shaft t, engaging with rack-teeth Q. By revolving the hand-wheel t' the tightener-frames P and P'' may be depressed to remove the strains from the belts which drive the rolls and stop the operation of the machine. By turning the hand-wheel t' in the opposite direction the tightener-pulley frame will be raised, the strain applied to the belts, and the machine set in motion.

The reels and conveyers are driven in the following manner: Power is transmitted from pulley d to transmitter d', on the shaft of which is keyed a pinion, r, driving bevel-pinion r', the latter being keyed to the upright shaft S. s represents a series of bevel-gears keyed to shaft S. s' represents bevel-gears meshing with bevels s and keyed to the conveyer-shafts K'. U' represents bevel-gears keyed to the reel-shafts G'' and driven by bevels U upon shaft S. The transverse distributer L'' is driven by a belt on pulleys e e' from the shafts of the slower-speeded rolls, as shown in Fig. 4.

Various modifications of driving these different parts may be employed without affecting the material features of my invention.

Pinions R are secured to shaft t by feathers, so as to allow either pinion to be moved laterally out of mesh with the rack-teeth Q, thus permitting either one of the tightener-pulleys T and T' to be raised or lowered independently to adjust the tightener-pulleys to the varying strains of the driving-belts, thereby securing uniform tautness of said belts.

I claim—

1. In a roller reducing-mill, the combination of a single set of rolls, adjustable journal-arms for one of the rolls, a hopper above the rolls, a through-shaft journaled to the frame of the machine and connected with the journal-arms of the movable roll, hopper-gate mechanism connected with the through-shaft, and a swinging lever attached directly to the latter to simultaneously adjust the roller-arms and the hopper-gate, substantially as described.

2. In a roller reducing-mill, the combination of a supporting-frame, a set of reducing-rolls, adjustable journal-arms for one of said rolls, a hopper, hopper-gate mechanism, a through-shaft connected with the hopper-gate mechanism and the adjustable roller-arms, a lever for rocking the said shaft, and a separating and conveying device receiving the reduced material from the rolls, substantially as described.

3. In a roller reducing-mill, the combination of a supporting-frame, a set of reducing-rolls, adjustable journal-arms for one of said rolls, a hopper, hopper-gate mechanism, a through-shaft connected with the hopper-gate mechanism and the adjustable roller-arms, a lever for rocking said shaft, a rotating reel receiving the reduced material from the rolls, and a secondary hopper arranged at the discharge end of the reel, substantially as and for the purposes described.

4. A reducing and separating mill combining in its structure a set of reducing-rolls, a rotating separating-reel, into one end of which the reduced material from the rolls is directly delivered, a longitudinal conveyer and hopper arranged beneath the reel, a secondary hopper for receiving the tailings from the reel, and a dust-tight compartment or housing inclosing all of said members, the secondary hopper being arranged to deliver the tailings from the revolving reel directly into another set of reducing-rolls for further reduction, substantially as herein set forth.

5. In a gradual-reduction mill, the combination of a series of mills, each composed of a set of reducing-rolls, receiving and discharging hoppers, a rotating separating-reel, and a conveyer, with a distributer arranged transversely in the hopper which receives the tailings from the reel for evenly distributing the material to the reducing-rolls of the adjacent mill, and a dust-tight compartment or housing inclosing the members comprising each mill, substantially as described.

6. In a roller reducing-mill, the combination of a series of reducing-rolls and hoppers arranged vertically above each other, hopper-gate mechanism for each hopper, vertical rods H, connecting the series of hopper-gate mechanisms, eccentrically-journaled shafts h, and an operating-lever, h', substantially as and for the purpose described.

7. The combination of a series of sets of reducing-rolls arranged vertically one above the other, roll-adjusting mechanism, a hopper for each set of rolls, hopper-gate mechanism for each hopper, vertical rods H, connecting the series of hopper-gate mechanisms, and an operating-lever, substantially as described.

8. The combination, with a series of reducing-mills, of a series of hoppers at opposite ends of the machine, hopper-gate mechanism, eccentrically-journaled shafts h and stud-arms H'', for the respective hoppers, the vertical and transverse rods H and H', connecting all the hopper-gate mechanisms, and an operating-lever, h', substantially as and for the purpose described.

9. In a gradual-reduction mill, the combination of the reducing-rolls, the rotating reel, the secondary hopper above the reducing-rolls of the mill next in series for receiving the tailings from the reel, and a transverse distributer, L', arranged in the secondary hopper for evenly distributing the tailings for the delivery of the same to another set of reducing-rolls, substantially as described.

10. In a gradual-reduction mill, the combination of a set of reducing-rolls and a rotating separating-reel arranged within one and the same compartment, with a hopper-bottom beneath the reel, and a conveyer, K', arranged longitudinally along said hopper for discharging the flour or middlings separated by the reel, substantially as described.

11. The roll-adjusting mechanism combining in its structure the swinging arms c, shafts c', through-shaft h, swinging arms F, journaled eccentrically to the latter, the adjustable springs, and the single hand-lever h', directly attached to shaft h, substantially as described.

12. The combination, in a roller-mill, of a single set of reducing-rolls with a hopper above the rolls, the hopper-gate, the through-shaft h, the link I', rack i, and rack I, mounted on the through-shaft, substantially as described.

13. The combination, in a roller-mill, of the series of reducing-rolls, the belt-and-pulley mechanism for driving the same, the tightener-pulleys at opposite sides of the machine, the racks carrying the tightener-pulleys, the through-shaft t, and the laterally-adjustable pinions R, whereby the tightener-pulleys can be separately adjusted, substantially as described.

In testimony whereof I have hereunto set my hand in the presence of two subscribing witnesses.

UDOLPHO H. ODELL.

Witnesses:
JNO. E. JONES,
J. H. CHARLES SMITH.